(12) United States Patent
Takahashi

(10) Patent No.: US 7,281,867 B2
(45) Date of Patent: Oct. 16, 2007

(54) CAMERA ATTACHING DEVICE

(75) Inventor: Masami Takahashi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 274 days.

(21) Appl. No.: 11/122,683

(22) Filed: May 5, 2005

(65) Prior Publication Data
US 2005/0249493 A1    Nov. 10, 2005

(30) Foreign Application Priority Data
May 7, 2004    (JP)    ............................. 2004-138251

(51) Int. Cl.
*G03B 17/00*    (2006.01)
(52) U.S. Cl. ...................... 396/427; 348/143
(58) Field of Classification Search ................ 396/427, 396/419; 348/143
See application file for complete search history.

(56) References Cited
U.S. PATENT DOCUMENTS

| | | | |
|---|---|---|---|
| 3,986,019 A | 10/1976 | Devos et al. | |
| 4,051,362 A | 9/1977 | Guggemos et al. | |
| 4,403,278 A | 9/1983 | Flood et al. | |
| 4,414,576 A * | 11/1983 | Randmae | 348/373 |
| 5,224,675 A * | 7/1993 | Ellenberger et al. | 248/183.4 |
| 5,790,910 A | 8/1998 | Haskin et al. | |
| 5,966,176 A * | 10/1999 | Chow et al. | 348/373 |
| 6,618,092 B2 * | 9/2003 | Alessio et al. | 348/373 |
| 7,066,662 B2 * | 6/2006 | Cuddeback et al. | 396/427 |
| 7,149,422 B2 * | 12/2006 | Schnell | 396/153 |
| 2002/0180867 A1 * | 12/2002 | Adair et al. | 348/158 |
| 2003/0053806 A1 * | 3/2003 | Schneider | 396/427 |
| 2003/0133013 A1 * | 7/2003 | Maeda et al. | 348/143 |

FOREIGN PATENT DOCUMENTS

JP        05-191689        7/1993

* cited by examiner

*Primary Examiner*—Christopher Mahoney
(74) *Attorney, Agent, or Firm*—Pearne & Gordon LLP

(57) ABSTRACT

A first attaching base member is fixed to a camera arranging place. A second attaching base member is attached to the first attaching base member. The first attaching base member and the second attaching base member form an internal wiring chamber for passing camera wiring therethrough. The second attaching base member is connected to the first attaching base member by a hinge portion so as to be opened and closed. Plural hinge portions are arranged so as to open and close the second attaching base member in plural directions. Thus, an attaching construction work can be easily made. Further, an external appearance image can be improved.

12 Claims, 6 Drawing Sheets

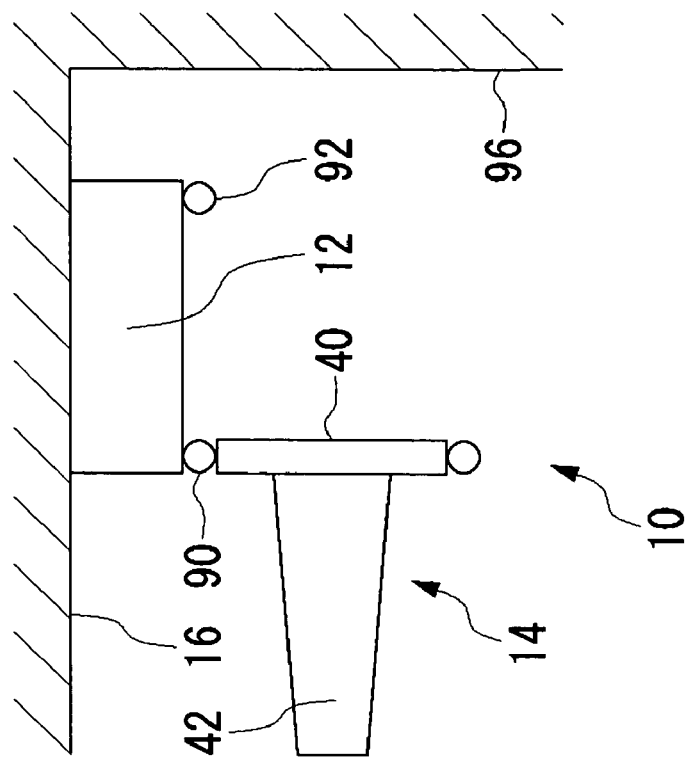
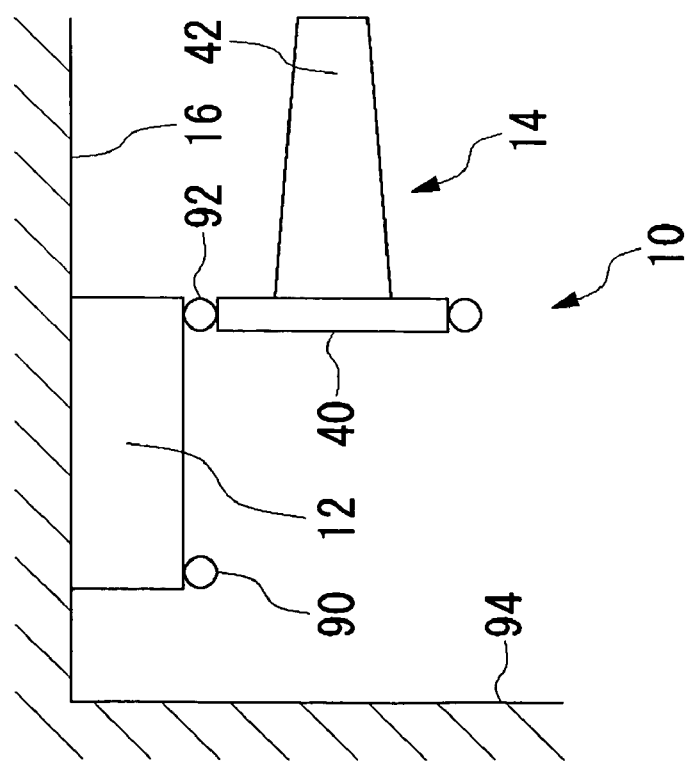
FIG. 5A
FIG. 5B

CAMERA ATTACHING DEVICE

BACKGROUND OF THE INVENTION

1. Field of the Invention

The present invention relates to a camera attaching device for arranging a monitor camera, etc.

2. Background Art

The camera attaching device is conventionally used to arrange the monitor camera, etc. on a wall face, a ceiling, etc. For example, the camera attaching device is disclosed in JP-A-5-191689 (p. 2 and FIG. 1).

FIG. 6 shows the conventional typical camera attaching device. The camera attaching device 100 is constructed by a camera attaching base 102. The camera attaching base 102 is fixed to an arranging face 104 of a wall, etc., and a camera 106 is attached to the camera attaching base 102. A cable 108 is extended from the camera 106 to the wall face, and is buried onto the wall face.

In a camera arranging work, a worker first performs connection processing of the cable 108 in a state in which the worker manually holds the camera 106 and the camera attaching base 102. Thereafter, the camera attaching base 102 is attached to the arranging face 104.

However, in the conventional camera attaching device, attaching construction work is not easy since the worker performs the connection processing in the state in which the worker manually holds the camera and the camera attaching base. Further, as shown in the above FIG. 6, an attaching portion of the camera attaching base and a cable burying portion are separately arranged, and the cable is exposed. Therefore, external appearance image is not good.

SUMMARY OF THE INVENTION

The present invention is made under the above background. An object of the present invention is to provide a camera attaching device in which the attaching construction work is easy and the external appearance image can be improved.

The present invention resides in a camera attaching device comprising a first attaching base member having an attaching portion attached to a camera arranging place, and a second attaching base member attached to the first attaching base member, wherein the first attaching base member and the second attaching base member form an internal wiring chamber for passing camera wiring therethrough, and the second attaching base member is hinge-connected to the first attaching base member so as to be opened and closed.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

FIGS. 5A and 5B show a selecting example of a hinge structure according to a camera arranging place.

DESCRIPTION OF THE PREFERRED EMBODIMENTS

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

This camera attaching device comprises a first attaching base member having an attaching portion attached to a camera arranging place, and a second attaching base member attached to the first attaching base member, wherein the first attaching base member and the second attaching base member form an internal wiring chamber for passing camera wiring therethrough, and the second attaching base member is hinge-connected to the first attaching base member so as to be opened and closed.

In accordance with this construction, in a state in which the first attaching base member is attached to the camera arranging place and the second attaching base member is attached to the first attaching base member, the second attaching base member is opened by utilizing the hinge and line connection processing of the internal wiring chamber can be performed. Accordingly, the attaching construction work can be easily made. Further, since the internal wiring chamber is arranged, camera wiring can be avoided from exposure and the external appearance image can be improved.

Further, in this camera attaching device, the first attaching base member and the second attaching base member may have plural hinge connecting structures so as to open and close the second attaching base member in plural directions.

In accordance with this construction, the camera can be arranged in corner portions of plural directions, and the degree of freedom of the camera arranging place can be increased.

As mentioned above, in the present invention, the attaching construction work can be easily made and the external appearance image can be improved by arranging the first attaching base member and the second attaching base member and constructing the internal wiring chamber by both the first and second attaching base members, and connecting both the first and second attaching base members by the hinge.

The camera attaching device of the embodiment mode of the present invention will next be explained by using the drawings.

Figure 1:
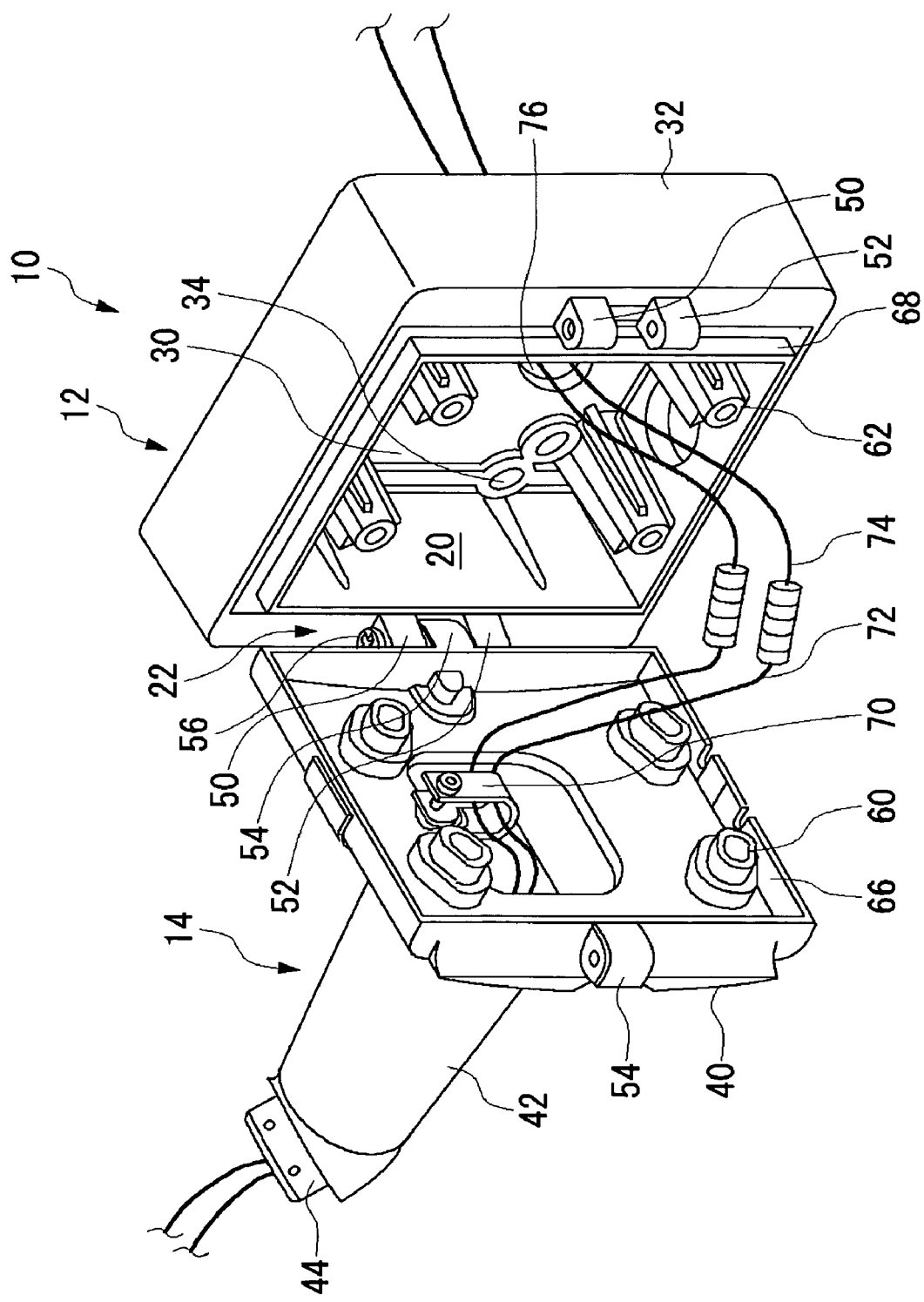
FIG. 1 is a perspective view of a camera attaching device in an embodiment mode of the present invention.
Figure 2:
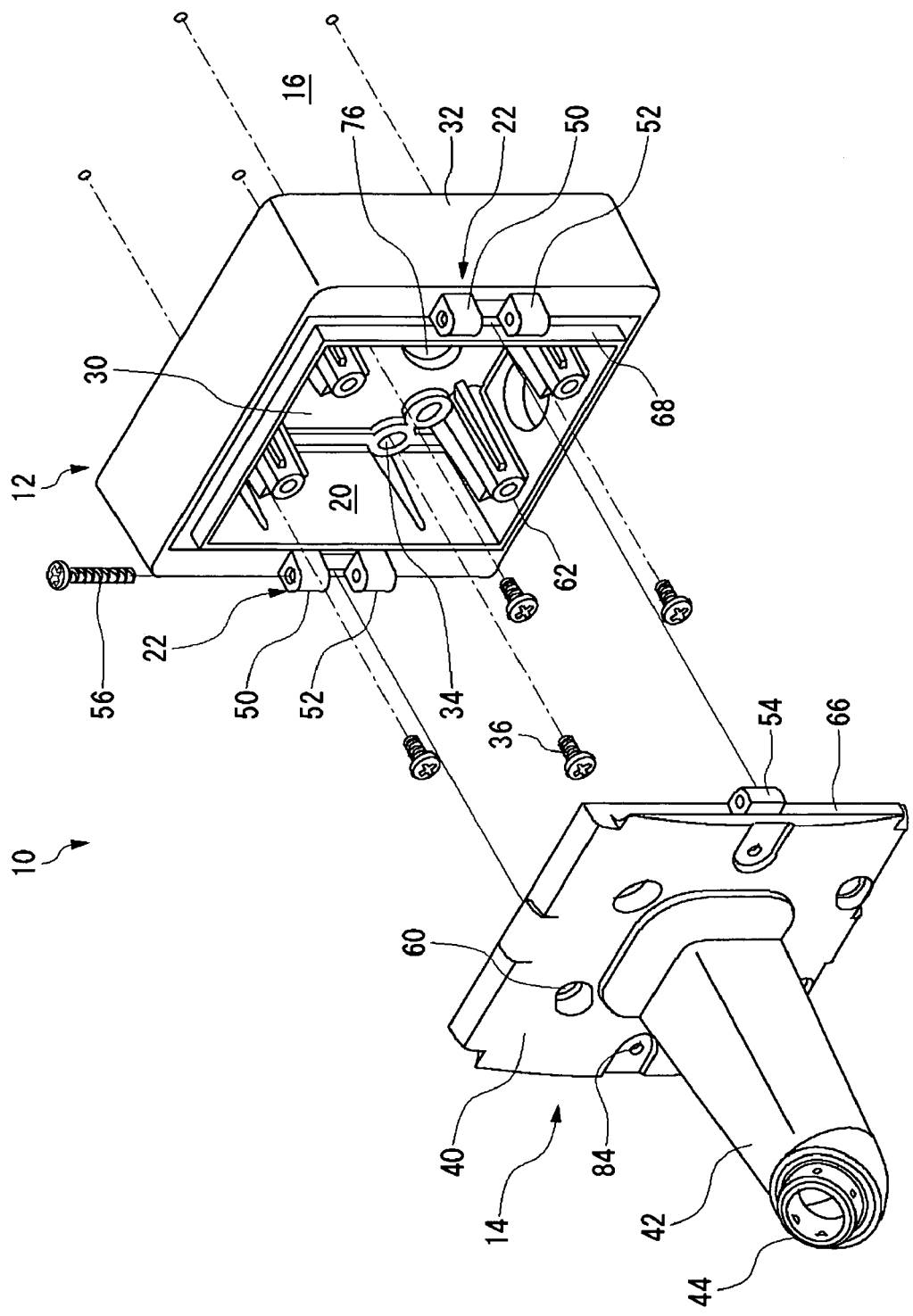
FIG. 2 is an exploded perspective view of the camera attaching device in the embodiment mode of the present invention.
Figure 3:
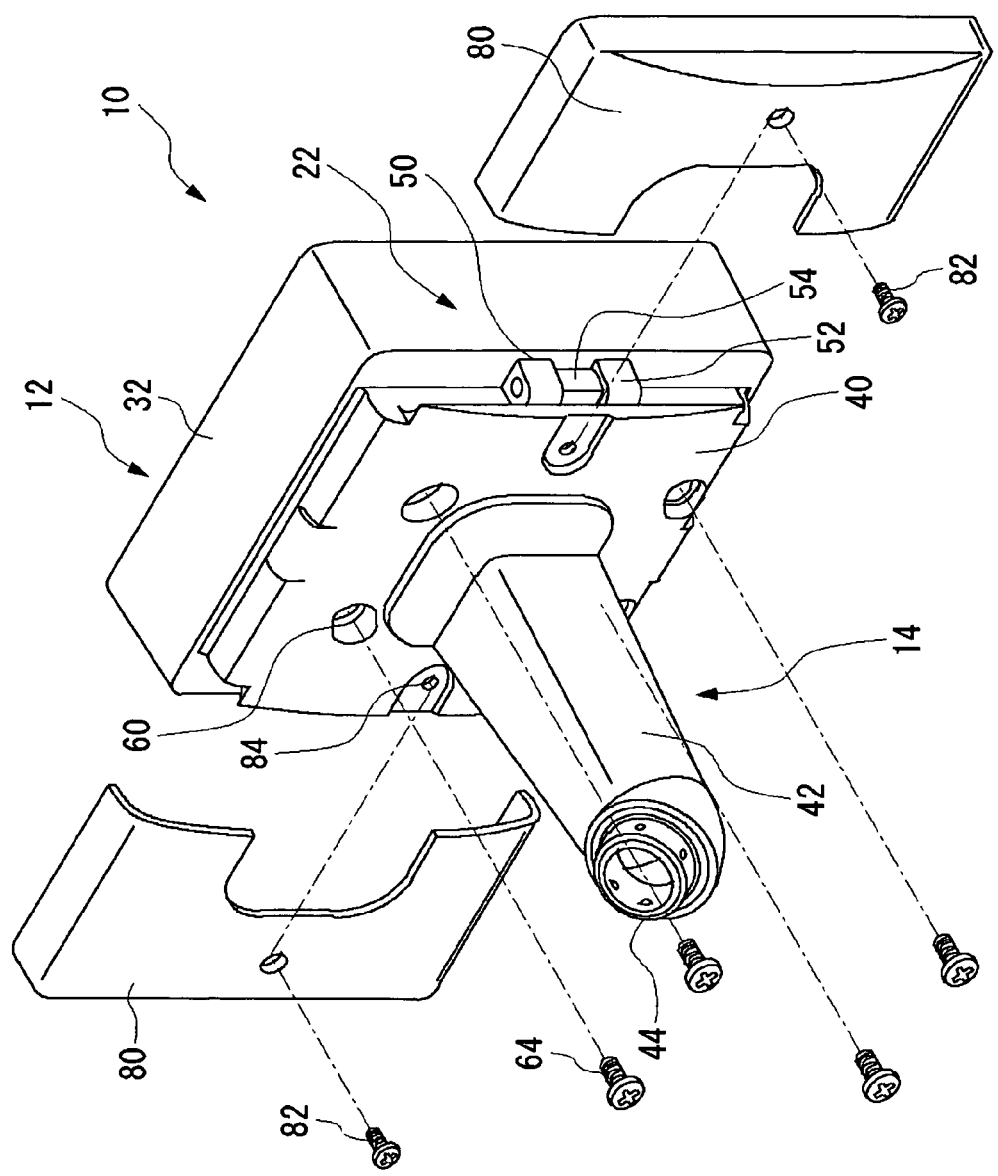
FIG. 3 is an exploded perspective view of the camera attaching device in the embodiment mode of the present invention.
Figure 4:
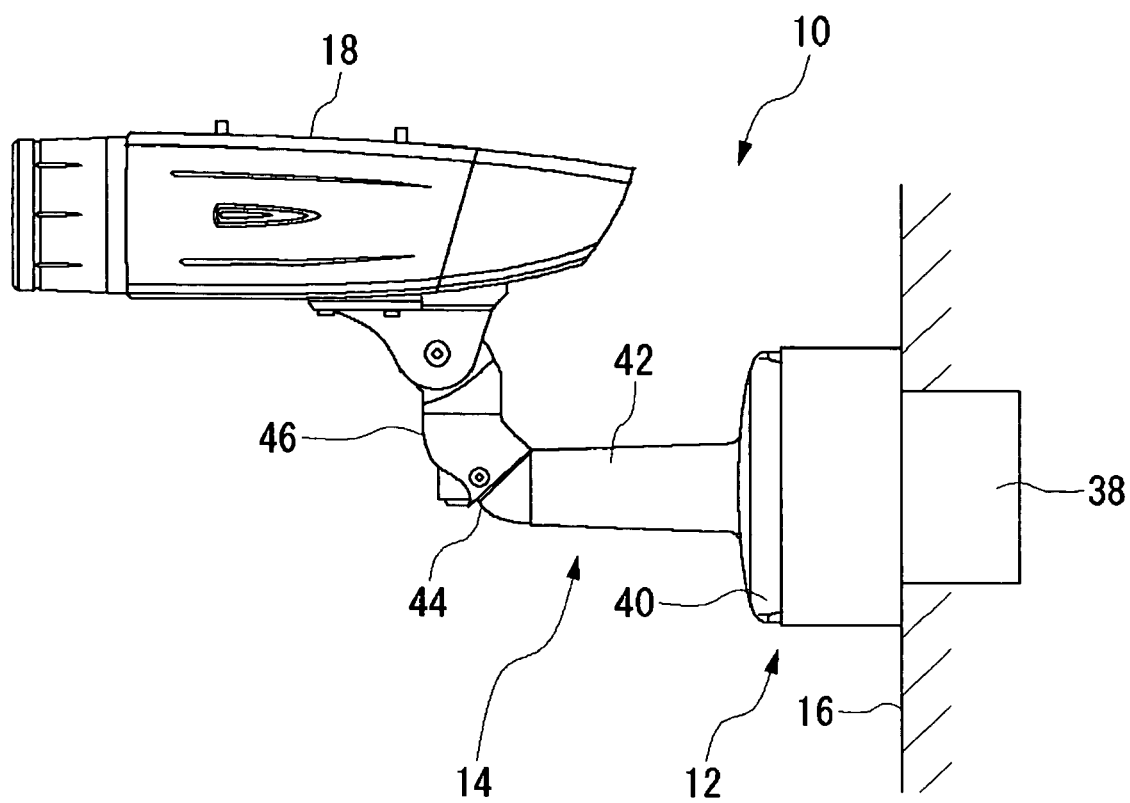
FIG. 4 is a view showing an arranging state of the camera attaching device in the embodiment mode of the present invention.
Figure 6:
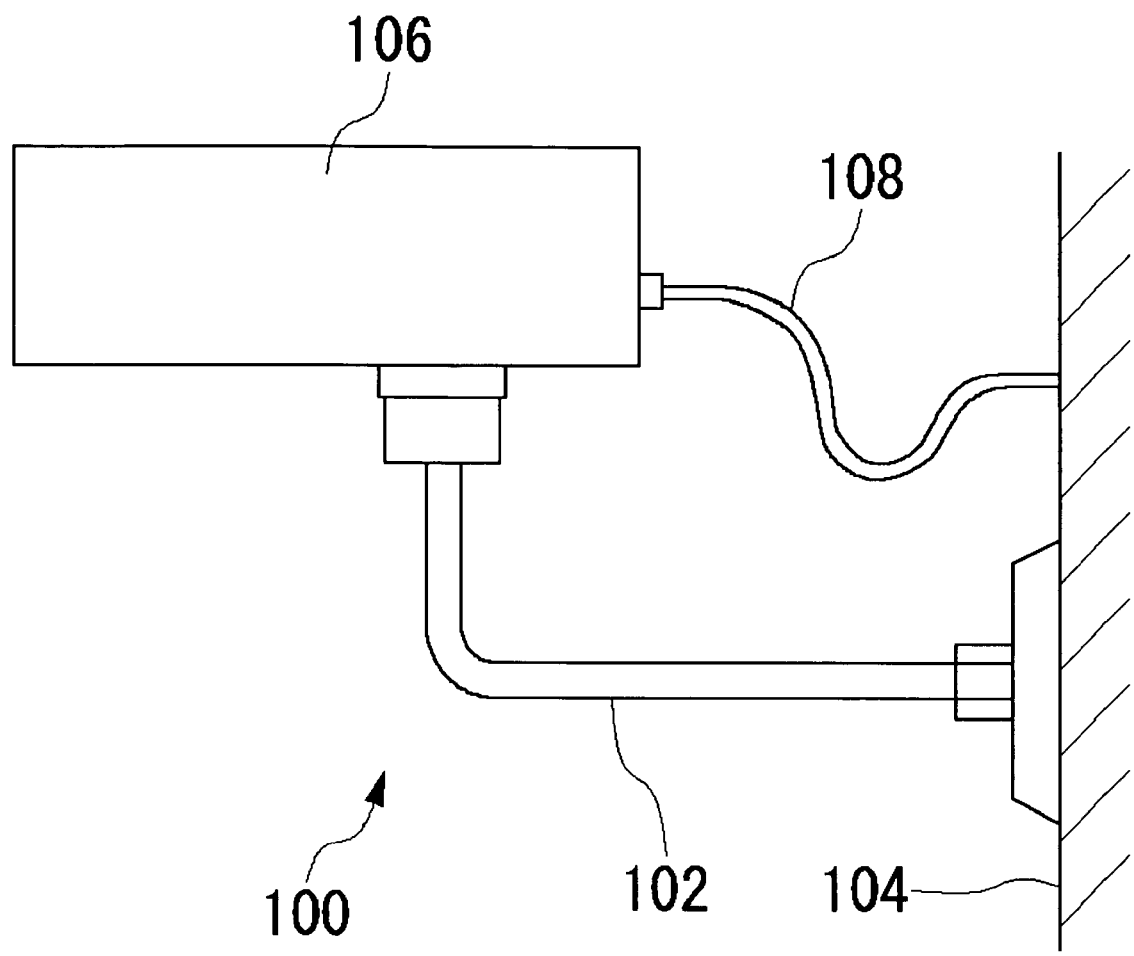
FIG. 6 is a view showing a conventional camera attaching device.

FIGS. 1 to 4 show the camera attaching device of the embodiment mode of the present invention. FIG. 1 is a perspective view of the camera attaching device. FIGS. 2 and 3 are exploded perspective views of the camera attaching device. FIG. 4 is a view showing an arranging state of the camera attaching device. In the example of FIG. 4, the arranging face is a wall.

As shown in these figures, the camera attaching device 10 has a first attaching base member 12 and a second attaching base member 14 as an entire construction. A camera attaching base is constructed by both the first attaching base member 12 and the second attaching base member 14. The first attaching base member 12 is attached to an arranging face 16. A camera 18 is attached to the second attaching base member 14. The first attaching base member 12 and the second attaching base member 14 form an internal wiring chamber 20 as an internal cavity. The second attaching base member 14 is attached to the first attaching base member 12 by a hinge portion 22 so as to be opened and closed. The construction of each portion will next be explained in detail.

The first attaching base member 12 is manufactured by aluminum and has a box shape. The first attaching base member 12 is constructed by a bottom plate 30 of a square shape and a side wall 32 arranged so as to surround the bottom plate 30. The bottom plate 30 functions as an attaching portion for attaching the first attaching base member 12 to the arranging face 16. Screws 36 are fastened to the arranging face 16 through holes 34 of the bottom plate 30 respectively. For example, a switch box 38 is buried within the arranging face 16, and the bottom plate 30 is fastened to the switch box 38.

The second attaching base member 14 is manufactured by aluminum, and is constructed by a cover portion 40 and an arm portion 42. The cover portion 40 has a square shape, and corresponds to the cover of a box shape structure of the first attaching base member 12. Namely, the cover portion 40 has a shape corresponding to the square shape made by the side wall 32 of the first attaching base member 12. Four sides of the cover portion 40 are connected to an end portion of the side wall 32 so that the internal wiring chamber 20 is formed.

The arm portion 42 has a shape of a sleeve type, and is projected from the center of the cover portion 40. A connecting portion 44 is arranged at the tip of the arm portion 42. The camera 18 is connected to the connecting portion 44. More specifically, a pan head 46 of the camera 18 is fitted to the connecting portion 44 of the arm portion 42, and both the cloud base 46 and the connecting portion 44 are fixed by screws.

The cover portion 40 is connected to the side wall 32 of the first attaching base member 12 by the hinge portion 22. Thus, the internal wiring chamber 20 can be opened and closed by rotating the cover portion 40 with the hinge portion 22 as a center. The hinge portion 22 is constructed by upper and lower convex portions 50, 52 arranged in end portions of the side wall 32, and a convex portion 54 arranged in an edge portion of the cover portion 40. The convex portion 54 of the cover portion 40 is inserted between the convex portions 50 and 52 of the side wall 32. A screw 56 then extends through the convex portions 50, 54, and is fastened to a screw hole of the convex portion 52. Thus, the screw 56 becomes a shaft and the convex portion 54 becomes a bearing so that a hinge structure is constructed.

As shown in the above figures, the hinge structure is arranged in each of two places on both sides of the first attaching base member 12 and the second attaching base member 14. Namely, the hinge structure is arranged in each of the two places with the internal wiring chamber 20 between. In this embodiment mode, one of the hinge structures in these two places is used. Namely, the screw 56 is assembled into one hinge structure, and the hinge function is obtained. The screw 56 is not assembled into the other hinge structure, and the other hinge structure is not used as a hinge. As described later, it is selected which hinge structure is used in accordance with a camera arranging place.

Further, four holes 60 are arranged in the cover portion 40 so as to surround the arm portion 42. Four bosses 62 are projected in the bottom plate 30 of the first attaching base member 12 correspondingly to the four holes 60. Screw holes are arranged in the bosses 62 respectively. Screws 64 are fastened to the bosses 62 through the holes 60 respectively. Thus, the second attaching base member 14 is fixed to the first attaching base member 12.

An edge wall portion 66 is arranged so as to be extended along the edge of the cover portion 40. An edge wall portion 68 is also arranged in the first attaching base member 12 along the end portion of the side wall 32. The edge wall portion 66 of the cover portion 40 is fitted to the outside of the edge wall portion 68 of the side wall 32. Thus, the invasion of dust, etc. into the internal wiring chamber 20 is prevented.

Further, a clamp 70 is attached to the rear side of the cover portion 40. The clamp 70 is arranged in an inlet portion to the internal cavity of the arm portion 42. A cable 72 of the camera side is caught in the clamp 70. The cable 72 is connected to the camera 18 through the interior of the arm portion 42.

The cable 72 of the camera side is connected to a cable 74 of the arranging face side within the internal wiring chamber 20. The cable 74 of the arranging face side is extended within the arranging face 16 through a hole 76 arranged in the bottom plate 30. The cable 74 is extended to the switch box 38 buried within the arranging face 16.

A decorative cover 80 manufactured by resin is attached to the front side of the cover portion 40. The decorative cover 80 is fixed to screw holes 84 of the cover portion 40 by screws 82.

The construction of the camera attaching device 10 of this embodiment mode has been explained as mentioned above. Next, an example of a preferable procedure of a camera attaching construction work using the camera attaching device 10 will be explained. When the camera is attached, the first attaching base member 12 is first fixed to the arranging face 16 by four screws 36. Here, the screw 36 is inserted into the hole 34 of the bottom plate 30, and is fastened to the switch box 38 buried within the arranging face 16. At this time, the cable 74 of the arranging face side is also pulled out into the box of the first attaching base member 12 through the hole of the bottom plate 30. The cable 74 is extended from the switch box 38.

Next, the hinge structure is formed by the second attaching base member 14 and the first attaching base member 12. The cover portion 40 of the second attaching base member 14 is set to approach the side wall 32 of the first attaching base member 12. The convex portion 54 of the edge of the cover portion 40 is then inserted between the two convex portions 50 and 52 of the side wall 32. The screw 56 is then inserted into the holes of the convex portions 50, 54, and is fastened to the screw hole of the convex portion 52. Thus, the hinge structure is obtained.

Next, the camera 18 is attached to the tip of the arm portion 42 of the second attaching base member 14. At this time, the cable 72 of the camera side is inserted into the arm portion 42. The cable 72 is inserted into the arm portion 42 and appears on the rear side of the cover portion 40 and is caught in the clamp 70. The clamp 70 is attached to the rear side of the cover portion 40 in advance. The cable 72 is then connected to the cable 74 of the arranging face side.

Next, the cover portion 40 is closed by using the hinge structure. The edge wall portion 66 of the cover portion 40 is fitted into the outside of the edge wall portion 68 of the side wall 32 of the first attaching base member 12. The screws 64 are then inserted into the holes 60 of the cover portion 40 and are fastened to the bosses 62 of the first attaching base member 12. Thus, the second attaching base member 14 is fixed to the first attaching base member 12.

Next, the decorative cover 80 is attached to the cover portion 40 by the screws 82. Thus, the camera attaching construction work is made.

FIG. 5 shows a selecting example of the hinge structure according to the camera arranging place. FIG. 5 is a schematic view of a state of the camera attaching device 10 seen from above. Hinge structures 90, 92 are respectively arranged on the left and right sides of the camera attaching device 10. The hinge structures 90, 92 are the same as the hinge structure 22 shown in FIG. 1, etc.

In FIG. 5A, the camera arranging place is located near a left-hand side wall 94. In this case, the hinge 92 of the right-hand side is used. Namely, a screw as a shaft is attached to the hinge 92 of the right-hand side. No screw is attached to the hinge 90 of the left-hand side. Thus, the second attaching base member 14 is opened and an internal line connecting work can be made without an interference of the arm portion 42 with the wall 94.

In FIG. 5B, the camera arranging place is located near the wall 96 of the right-hand side. In this case, a screw as a shaft is attached to the hinge 90 of the left-hand side. Thus, the hinge 90 of the left-hand side is used. Accordingly, in this case, the second attaching base member 14 is also opened and the internal line connecting work can be also made without an interference of the arm portion 42 with the wall 96.

As explained above, the camera attaching device 10 of this embodiment mode has the first attaching base member and the second attaching base member, and the internal wiring chamber is constructed by both the first attaching base member and the second attaching base member, and both the first attaching base member and the second attaching base member are connected by the hinge. In a state in which the first attaching base member 12 is fixed to the camera arranging place and the second attaching base member 14 is attached to the first attaching base member 12, the second attaching base member is opened by utilizing the hinge portion 22 and the line connection processing of the internal wiring chamber 20 can be performed. Accordingly, the attaching construction work can be easily made. Further, since the internal wiring chamber 20 is arranged, camera wiring can be avoided from exposure and the external appearance image can be improved.

Further, in accordance with the camera attaching device 10 of this embodiment mode, the first attaching base member 12 and the second attaching base member 14 have plural hinge connecting structures so as to open and close the second attaching base member in plural directions. Thus, the camera can be arranged in corner portions of the plural directions, and the degree of freedom of the camera arranging place can be increased.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. A camera attaching device comprising a first attaching base member having an attaching portion attached to a camera arranging place, and a second attaching base member attached to said first attaching base member, wherein said first attaching base member and said second attaching base member form an internal wiring chamber for passing camera wiring therethrough, and said second attaching base member is hinge-connected to said first attaching base member so as to be opened and closed, and wherein said second attaching base member includes an outwardly projecting arm portion with a camera connecting portion.

2. The camera attaching device according to claim 1, wherein said first attaching base member and said second attaching base member have plural hinge connecting structures so as to open and close said second attaching base member in plural directions.

3. The camera attaching device according to claim 2, wherein said second attaching base member can be selectively opened and closed in one of said plural directions without an interference of the arm portion with a surrounding structure.

4. The camera attaching device according to claim 2, wherein
the first attaching base member has a first convex portion and a second convex portion, said second convex portion is provided with a screw hole,
said second attaching base member has a third convex portion, said third convex portion of said second attaching base member is inserted between said first convex portion and said second convex portion of said first attaching base member, and
a screw extends through said first convex portion of said first attaching base member and said third convex portion of said second attaching base member, the screw is fastened to said screw hole of said second convex portion of said first attaching base member to hinge connect said second attaching base member to said first attaching base member so as to be opened and closed.

5. The camera attaching device according to claim 1, wherein said first attaching base member and said second attaching base member are hinge-connected through convex portions.

6. The camera attaching device according to claim 1, wherein said arm portion houses said camera wiring that passes from said internal wiring chamber.

7. The camera attaching device according to claim 1, wherein a clamp for catching said camera wiring is located in said internal wiring chamber.

8. The camera attaching device according to claim 1, wherein said attaching portion is fastened to a switch box in the camera arranging place.

9. The camera attaching device according to claim 1, wherein said camera connecting portion enables a camera to be pivotally connected.

10. The camera attaching device according to claim 1, wherein said camera connecting portion is configured to achieve various orientations of a camera.

11. The camera attaching device according to claim 1, comprising:
a plurality of holes arranged in said second attaching base member so as to surround the arm portion; and a plurality of bosses projected in a bottom portion of said first attaching base member correspondingly to said plurality of holes.

12. The camera attaching device according to claim 1, comprising:

a decorative cover configured to be attached to a front side of a cover portion of said second attaching base member.

* * * * *